(12) United States Patent
Song et al.

(10) Patent No.: US 9,552,235 B2
(45) Date of Patent: Jan. 24, 2017

(54) USING PAGERANK ALGORITHM-BASED LOCK ANALYSIS TO IDENTIFY KEY PROCESSES FOR IMPROVING COMPUTING SYSTEM EFFICIENCY

(71) Applicant: VMware, Inc., Pala Alto, CA (US)

(72) Inventors: Jiaojiao Song, Mountain View, CA (US); Zhelong Pan, Cupertino, CA (US); Inna Rytsareva, Atlanta, GA (US)

(73) Assignee: VMware Inc., Palo Alto, CA (US)

( * ) Notice: Subject to any disclaimer, the term of this patent is extended or adjusted under 35 U.S.C. 154(b) by 50 days.

(21) Appl. No.: 14/634,502

(22) Filed: Feb. 27, 2015

(65) Prior Publication Data

US 2016/0253221 A1  Sep. 1, 2016

(51) Int. Cl.
| | | |
|---|---|---|
| *G06F 9/46* | (2006.01) | |
| *G06F 7/38* | (2006.01) | |
| *G06F 9/52* | (2006.01) | |
| *G06F 9/50* | (2006.01) | |

(52) U.S. Cl.
CPC .............. *G06F 9/524* (2013.01); *G06F 9/468* (2013.01); *G06F 9/5022* (2013.01)

(58) Field of Classification Search
None
See application file for complete search history.

(56) References Cited

U.S. PATENT DOCUMENTS

| | | | | |
|---|---|---|---|---|
| 8,185,908 | B2 * | 5/2012 | Taniguchi ............. | G06F 9/5038 709/221 |
| 2008/0005742 | A1 * | 1/2008 | Ma ...................... | G06F 11/0715 718/102 |
| 2013/0339974 | A1 * | 12/2013 | Mitchell ................. | G06F 9/50 718/104 |

* cited by examiner

*Primary Examiner* — Bing Zhao

(57) ABSTRACT

A system is described for identifying key lock contention issues in computing devices. A computing device is executed and lock contention information relating to operations during execution of the computing device is recorded. The data is parsed and analyzed to determine blocking relationships between operations due to lock contention. Algorithms are implemented to analyze dependencies between operations based on the data and to identify key areas of optimization for performance improvement. Algorithms can be based on the Hyperlink-Induced Topic Search algorithm or the PageRank algorithm.

20 Claims, 7 Drawing Sheets

USING PAGERANK ALGORITHM-BASED LOCK ANALYSIS TO IDENTIFY KEY PROCESSES FOR IMPROVING COMPUTING SYSTEM EFFICIENCY

TECHNICAL FIELD

The present disclosure generally relates to techniques for optimizing software lock contention in computing systems.

BACKGROUND

Optimizing complex software-based systems presents one of the biggest challenges for computer engineers today. As programs and computer systems become more and more sophisticated, identifying the key areas of inefficiencies for improving performance becomes a formidable challenge. Particularly in network environments, where multiple machines may be interconnected and various interactions take place between different software, identifying inefficiencies can require complex analysis of enormous volumes of data. Furthermore, as the limits of processing power and network bandwidth in computing systems are reached, inefficiencies can result in significantly degraded user experience, often manifested through slow or interrupted operation.

For example, in a computing system, when a process blocks other processes from completing by locking a resource that is required by the other processes, known as lock contention, significant inefficiencies can result. Lock contention can have wide-spreading effects in a computing system when multiple processes have interdependencies. Hence, identifying and improving processes that cause inefficiencies due to lock contention is a vital task for improving system efficiency. However, particularly in complex systems, identifying the key processes that cause inefficiencies can be a daunting task involving sophisticated analysis of large numbers of processes, complicated interdependencies, and lock contention events. A more efficient approach is desirable for identifying lock contention-related issues in computing systems.

DETAILED DESCRIPTION

Figure 1:
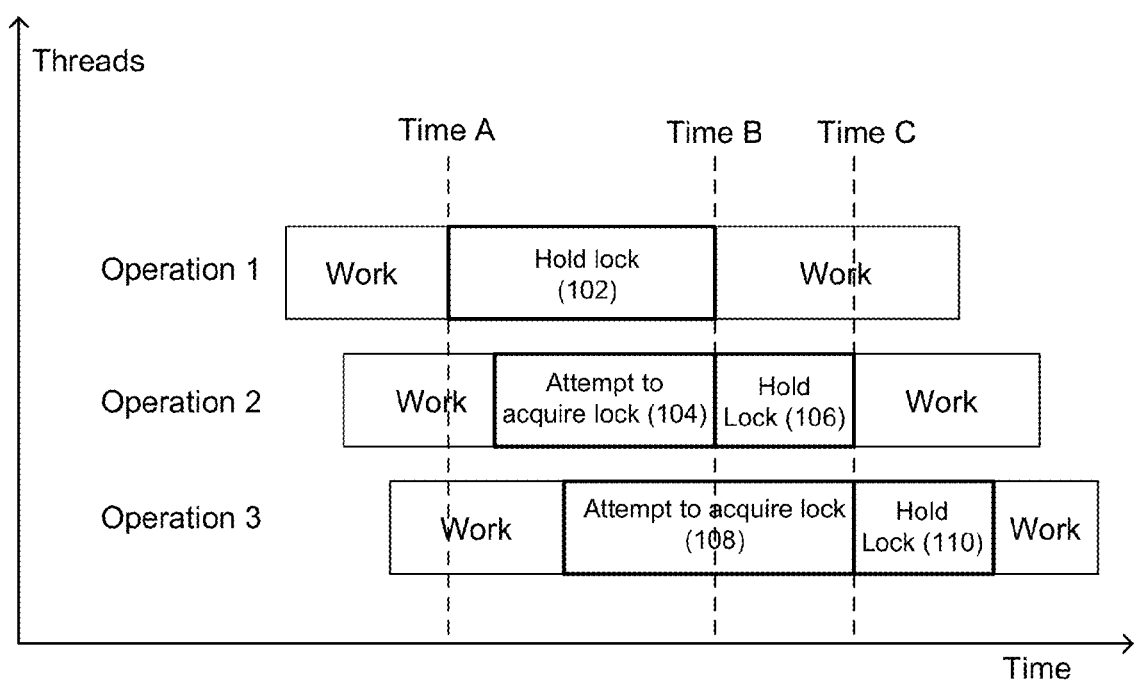
FIG. 1 illustrates an example chart showing blocking relationships between three operations, in accordance with various embodiments.

Systems and methods in accordance with various embodiments of the present disclosure overcome at least some of the above-mentioned shortcomings and deficiencies by providing improved ways to identify lock-related inefficiencies in computing devices. In particular, embodiments described herein provide improved ways to identify key processes that can be improved to reduce inefficiencies due to lock contention in computing devices.

Various computing devices suffer from operation latency and reduced concurrency caused by lock contention. Locks preserve managed object properties to protect shared states and guarantee consistency. Computing devices can have multiple threads using locks to protect data. When shared data is accessed, it is locked to update and read the data before the lock is released. Often, performance cannot be significantly improved by adding more CPU and processing resource if lock contention is the bottleneck of the process. To improve performance, it may be necessary to determine why one operation is blocked by other activities. However, particularly in large complex systems, lock analysis can be challenging, involving multiple threads, multiple locks, nested locks of multiple objects, and a large amount of time-sequence data. This disclosure provides systems and methods to analyze data collected during device operation, and identify and summarize lock contention relationships and process bottlenecks based on the collected data.

In various embodiments, during operation of a computing device, such as a server in a data center, different types of data can be collected from the computing device. For example, data can be collected over a defined period of time or time interval, such as one hour, through recorded server log files. Once the data is collected, it is analyzed to determine which operations cause lock contentions in the computing device. For example, lock contention occurs when an operation is unable to acquire a lock on an object because another operation is holding a lock on the object. An object can be any managed resource, for example, in the enterprise network setting, typical managed objects are data objects, database entries, virtual machines, hosts, clusters, resource pools, etc.

To identify and describe lock contention events, the data can be analyzed to determine when an operation is waiting to acquire a lock on an object, how long the wait time is, and what operation is holding a lock on the object to block the first operation from acquiring the lock. Such information regarding blocking relationships can be obtained from the recorded data for various operations or threads during execution of the computing device. The data about the blocking relationships can then be compiled and analyzed to find how lock contention events affect system performance and where lock contentions cause inefficiencies.

However, particularly in complex systems with large numbers of operations, these methods may generate extremely high volumes of lock contention data. For example, the data might include extremely large numbers of blocking relationships. Analyzing large volumes of data presents significant challenges. This disclosure describes systems and methods for efficient analysis of data to identify key operations causing system inefficiency due to lock contention.

In various embodiments, to analyze data, blocking relationships can be plotted into a data structure, such as a graph, that contains a plurality of nodes, where each node represents a process, such as a thread of execution, an operation, or lines of code. Links between the nodes can represent blocking relationships due to lock contention between the corresponding processes. The graph thus contains a representation of nodes between which blocking relationships are observed. A visual representation of the graph can be displayed to a user. For example, the nodes of the graph can be represented by circles or dots. Blocking relationships between the nodes can also be demonstrated visually such that a human viewer of the visual representation can readily determine the blocking relationships between nodes. For example, an arrow pointing from node A to node B can represent node B blocking node A. Further, the visual representation of the graph can illustrate the frequency or total amount of time that one node blocks another node, for example, by varying the thickness or weight of the arrow connecting the nodes. In various embodiments, the frequency of blocking can refer to the frequency with which one node blocks another node during the time interval; for example, frequency can refer to the total number of times that one node blocks another node during the time interval. Additionally, the visual representation can illustrate the relative tendency of a node to block other nodes or to be blocked by other nodes. For example, a node that blocks more nodes than another node can be larger in size and a node that is blocked by more nodes than another node can be darker in color.

The selection of graphical representations to convey various parameters (e.g., direction of arrow, weight of arrow, size of node, color of node, shape of node, etc.) is arbitrarily chosen in this description for purposes of illustration. In various embodiments, the graphical representations described above may be used to illustrate different parameters, e.g., arrows may point in the opposite direction, node size can be used to illustrate the tendency of a node to be blocked by other nodes, node color may be used to illustrate the tendency of a node to block other nodes, and other graphical representations not mentioned here may be used to illustrate the same parameters without straying from the scope of this invention.

Accordingly, such a graph can summarize large volumes of blocking relationship data, which can otherwise be extremely burdensome to interpret, in a visual representation that allows the blocking relationships to be readily analyzed. For example, the graph can demonstrate which nodes block which nodes, which nodes block other nodes relatively frequently, which nodes are blocked by other nodes relatively frequently, the frequency of blocking between nodes, or the blocking time between nodes. In various embodiments, blocking time between nodes can be the total cumulative blocking time between the nodes, the average blocking time between two nodes, the longest blocking time between two nodes, or any other time-related metric regarding the blocking relationship. In various embodiments, frequency can refer to the total number of times that one node blocks another node during the time interval.

In various embodiments, a node's role in lock contention can be determined and quantified based on the Hyperlink-Induced Topic Search ("HITS") algorithm, which is generally used for web page link analysis. In this embodiment, each node is assigned a criminal score and a victim score. A node's criminal score indicates the tendency of the node to block other nodes. A node's victim score indicates the tendency of that node to be blocked by other nodes. Each node's criminal score is based on the nodes that are blocked by the node, and the node's victim score is based on the nodes that block the node. In various embodiments, each node's criminal score can be equal to the weighted sum of the victim scores of the nodes that the node blocks. Further, the criminal score can be normalized; for instance, by dividing the criminal score by a normalization factor. For example, each criminal score can be normalized by dividing the criminal score by the square root of the sum of the squares of all criminal scores in the graph. Further, the node's victim score can be equal to the weighted sum of the criminal scores of the nodes that block the node. Similarly, the victim score can be normalized; for instance, by dividing the victim score by a normalization factor. For example, each victim score can be normalized by dividing the victim score by the square root of the sum of the squares of all victim scores in the graph. The algorithm performs several iterations, each iteration containing two steps. In the first step, the algorithm updates the victim score of all the nodes, in the second step, the algorithm updates the criminal score of all the nodes. The iterations can continue until the algorithm converges.

The HITS algorithm approach has certain benefits. For example, the scores of the nodes calculated using the HITS algorithm reflect the interaction of each node with the broader system as opposed to just the nodes that block or are blocked by the node. Namely, the algorithm determines a node's victim and criminal scores based on the criminal and victim scores of not only the nodes that are directly blocking or are directly blocked by the node but also on the scores of nodes with which the node does not have direct blocking relationships. Accordingly, a node's criminal and victim scores reflect broader system effects than a simpler approached based only on the number of blocking relationships that a node has.

In yet another embodiment, a node's role in lock contention can be determined and quantified based on the PageRank algorithm, which is also generally used for web page link analysis. In this embodiment, each node is assigned an optimization priority score. As used herein, the terms "optimization priority score" and "priority score" are interchangeable. Each node's optimization priority score is based on the priority scores of the nodes that are blocked by the node. For example, each node's priority score can be equal to sum of weighted, normalized priority scores of the nodes that the node blocks. The algorithm performs several iterations. In each iteration, the algorithm updates the priority score of all the nodes. The iterations can continue until the algorithm converges.

The PageRank algorithm approach has certain benefits. For example, the priority score of a node calculated using the PageRank algorithm reflects the interaction of the node with the broader system as opposed to just the nodes that have direct blocking relationships with the node. Namely, the algorithm determines a node's priority score based on the priority scores of not only the nodes that are blocked by the node but also on the scores of nodes with which the node does not have direct blocking relationships. Accordingly, a node's priority score reflects broader system effects than a simpler approached based only on direct blocking relationships.

As used herein, the term "node" refers to the representation, in the data structure or graph setting, of a process in the execution of a computing device, such as a thread of execution, an operation, an operation type, or code lines. As used herein, the term "lock contention" refers to a process being unable to acquire a lock on an object or resource because another process is holding a lock on the same object or resource. As used herein, the term "blocking relationship" refers to a process blocking another process from completing due to lock contention. As used herein, the term "computing device" refers to any computing machine, whether physical such as a desktop computer, laptop, tablet, smartphone, etc., or virtual, such as a virtual machine. A computing device can also involve several interconnected computing machines, such as various computers connected through a communication network.

In various embodiments, data related to blocking relationships between processes in execution of the computing device can be collected. For example, the computing device can be executed and data can be collected during a predefined time interval while the computing device is running, such as an hour or several hours. The recorded data includes information necessary for determining when blocking relationships exist between processes, the duration of such locks, and other information to lock relationships between processes. For example, the data can include information related to processes attempting to acquire locks, processes obtaining a lock, processes being unable to acquire locks, as well as time stamps indicating the time when such events take place.

In an embodiment, the data can be collected through log messages. The log messages can contain information such as source code lines, to identify which code lines generate the messages. In addition, the log message can contain information such as thread id, object, lock mode, lock stage, operation, timestamp, and duration. The following is an example of such a log message:

---
2013-12-19T01:34:50.693Z [7F5EF3C78700 warning 'MoLock' opID=cf3e1d4d-9765-45f9-963f-3196700de36b-7B-77-7f]
*WARNING* Lock vm-9934 mode EXCLUSIVE held for 1560 ms - - - bora/vpx/vpxd/vm/powerOnHandler.cpp:204
---

The above log message shows that at time 01:34:50.693, thread 7F5EF3C78700 held a lock on the object vm-9934 for 1560 ms. Furthermore, the lock was requested by the code bora/vpx/vpxd/vm/powerOnHandler.cpp at line 204.

Based on such log messages, the system can find which threads are waiting for the same lock. Because many threads and a lot of code may attempt to acquire the same lock, it is difficult to find the root cause of the lock contention. For example, to resolve contention issues for a lock, an engineer would need to read a lot of code, which is difficult. Accordingly, the systems and methods described herein extract the locking information out of logs, analyze the large volume of data, and derive meaningful information to show dependencies and identify bottlenecks in the process.

To digest the large amounts of locking messages, the same type of log messages can be grouped. For example, the messages can be summarized by computing the number of locking messages and their total time, for the same code line, lock stage, lock mode, and object. Table 1 shows an example of such results. This table is a highly summarized version of locking messages. In the example of Table 1, we see that the 317th line of the code cluster.cpp locked host for too long. When invtHostCnx.cpp tried to acquire a lock on host, it waited 38,357,989 milliseconds. Hence, the latter is blocked by the former.

dependency and blocking relationships by analyzing the threads and timestamps of the locking messages. A set of algorithms can extract blocking relationships for different situations. Once blocking relationship data is obtained, blocking relationships and lock dependencies can be plotted into a data structure and visualized on a graph or chart such that the root cause of lock contention issues can be easily identified by viewing the graph or chart.

FIG. 1 illustrates an example chart showing blocking relationships between three operations, in accordance with various embodiments. As illustrated in the example of FIG. 1, concurrent threads may result in lock contention when they try to acquire a lock on same object. In various embodiments, locking relationships such as the locking relationships illustrated in the example chart of FIG. 1 can be determined by parsing and analyzing log messages. As illustrated, there are three operations, or threads, occurring in this chart, operation 1, operation 2, and operation 3. Operation 1 starts working first and it issues a lock on the object at time A to access it exclusively. Operation 1 holds the lock for a time period 102 and releases the lock at time B. After releasing the lock, operation 1 continues working. Operation 2 starts working at some time before time A and tries to acquire a lock on the object. During a period of time 104, operation 2 attempts to acquire a lock on the object. However, because operation 1 holds a lock from time A to time B 102, operation 2 is unable to acquire the lock during the period 104, until time B. When operation 1 releases the lock at time B, operation 2 locks the object and continues holding the lock for a period of time 106 until it releases the lock at time C. Operation 3 starts working at some time before time A and attempts to acquire a lock on the object during a period of time 108. However, because operation 1 holds a lock from time A to time B 102 and operation 2 holds a lock from time B to time C 106, operation 3 is unable to acquire the lock during the period of time 108, until time C. When operation 2 releases the lock, operation 3 locks the object and holds the lock for a period of time 110 before releasing the lock and continuing to work.

In various embodiments, blocking relationships such as the relationships illustrated in FIG. 1 can be determined by parsing logs to get information for operations and correlating operations to determine their dependency. However, when there are too many dependencies, it can be difficult to visualize them through a chart as in FIG. 1. Further parts of this description will describe how large quantities of blocking relationships can be visualized in a dependency graph such that lock contention issues can be easily identified by viewing the graph.

In various embodiments, operation information can be extracted from logs to detect dependency relationships between operations and to visualize all relationships in a graph. Such logs can contain information such as operation start time, end time, lock acquiring time, lock acquiring

TABLE 1

| Code line | Object | Mode | Stage | Count | Total Time |
|---|---|---|---|---|---|
| bora/vpx/drs/snapshot/cluster.cpp:317 | host | SHARE | Locked | 149936 | 540123895 |
| bora/vpx/vpxd/invtHostCnx.cpp:2087 | host | EXCLUSIVE | Acquiring | 9668 | 38357989 |
| bora/vpx/vpxd/vmcheck/vmState.cpp:43 | vm | SHARE | Locked | 16582 | 30502248 |

As discussed above, long lock acquiring time may be caused by another code's long lock holding time. To capture the dependency accurately, the system can visualize lock duration, lock start time, and lock held duration. However, an operation's basic information and lock information can be in different logs. Therefore, the basic information can be obtained first and a thread Id and an operation Id can be used to search for related lock information.

The following is an example of two log messages relating to an operation:

```
2012-09-19T06:45:15.149-07:00 [7F7E93413700 info 'commonvpxLro'opID=ad871fae]
[VpxLRO] - BEGIN task-18841 - vm-5824 - vim.VirtualMachine.powerOn - 4d27cf71-0bb0-
673e-581c-422bfe0a7907(52f1fc66-6f48-cdd7-ad82-1e73ea310817)
2012-09-19T06:45:38.660-07:00 [7F7E93413700 info 'commonvpxLro' opID=ad871fae]
[VpxLRO] - FINISH task-18841 - vm-5824 - vim.VirtualMachine.powerOn -
```

The operation can be identified using the thread Id and the operation Id. In the above example, the thread Id is "7F7E93413700" and the operation Id is "ad871fae". These two logs are corresponding to the operation's start time and end time.

After determining the operation Id and the thread Id to identify an operation, all logs with the same operation Id and thread Id can be searched and logs related to locks can be filtered out. For example, logs found through such a search might be as follows:

```
2012-09-19T06:45:26.306-07:00 [7F7E93413700 warning 'MoLock'
opID=ad871fae] Locking domain-c7 in mode: EXCLUSIVE took 3663 ms
2012-09-19T06:45:17.312-07:00 [7F7E93413700 warning 'MoLock'
opID=ad871fae] *WARNING* Lock domain-c7 mode SHAREALL
held for 2115 ms
```

The first log indicates that this operation successfully got a lock on an object identified as domain-c7 at time 2012-09-19T06:45:26.306. It waited for this lock for 3663 ms. The second log tells us that this operation held a lock on domain-c7 for 2115 ms and released it at time 2012-09-19T06:45:17.312.

Hence, all information needed to determine when an operation, process, or thread is waiting for a lock and when it acquires a lock can be obtained through such logs. Then, the algorithm can correlate different operations' locking dependency by the time stamp and the locking objects to determine when one operation is blocking another operation due to lock contention.

Accordingly, after log messages are generated and recorded, the logs are analyzed to determine blocking relationships between operations. Namely, the logs can be analyzed to determine when processes hold locks on objects, when processes are attempting to acquire locks on objects, and the lock modes that are used by the nodes. For example, the lock mode can be an exclusive locking mode, which blocks both share mode and exclusive mode; or the lock mode can be a share mode, which only blocks exclusive mode. Consequently, blocking relationships between processes can be determined based on the following logic: if operation A holds a lock on an object while operation B is acquiring a lock on the same object and the locking mode of operation A blocks the locking mode of operation B, then operation A blocks operation B. Similarly, the frequency and block time of the blocking relationships can be determined from the logs. For example, frequency can refer to the total number of times that one process blocks another process during the time interval.

As described above, in various embodiments, the system can determine blocking relationships between operations based on recorded run data such as log messages. However, in situations with large numbers of blocking relationships or dependencies, visualizing the relationships through a chart such as the example of FIG. 1 may not be practical.

Accordingly, in various embodiments, to analyze data, blocking relationships can be plotted into a data structure, such as a graph, that contains a plurality of nodes, where each node represents a process, such as a thread of execution, an operation, or lines of code. Links between the nodes can represent blocking relationships due to lock contention between the corresponding processes. The graph thus contains a representation of nodes between which blocking relationships are observed. A visual representation of the graph can be displayed to a user. For example, the nodes of the graph can be represented by circles or dots. Blocking relationships between the nodes can also be demonstrated visually such that a human viewer of the visual representation can readily determine the blocking relationships between nodes. For example, an arrow pointing from node A to node B can represent node B blocking node A. Further, the visual representation of the graph can illustrate the frequency or total amount of time that one node blocks another node, for example, by varying the thickness or weight of the arrow connecting the nodes. In various embodiments, the frequency of blocking can refer to the frequency with which one node blocks another node during the time interval; for example, frequency can refer to the total number of times that one node blocks another node during the time interval. Additionally, the visual representation can illustrate the relative tendency of a node to block other nodes or to be blocked by other nodes. For example, a node that blocks more nodes than another node can be larger in size and a node that is blocked by more nodes than another node can be darker in color.

Accordingly, such a graph can summarize large volumes of blocking relationship data, which can otherwise be extremely burdensome to interpret, in a visual representation that allows the blocking relationships to be readily analyzed. For example, the graph can demonstrate which nodes block which nodes, which nodes block other nodes relatively frequently, which nodes are blocked by other nodes relatively frequently, the frequency of blocking between nodes, or the blocking time between nodes. In various embodiments, blocking time between nodes can be the total cumulative blocking time between the nodes, the average blocking time between two nodes, the longest blocking time between two nodes, or any other time-related metric regarding the blocking relationship. In various embodiments, frequency can refer to the total number of times that one node blocks another node during the time interval.

Figure 2:
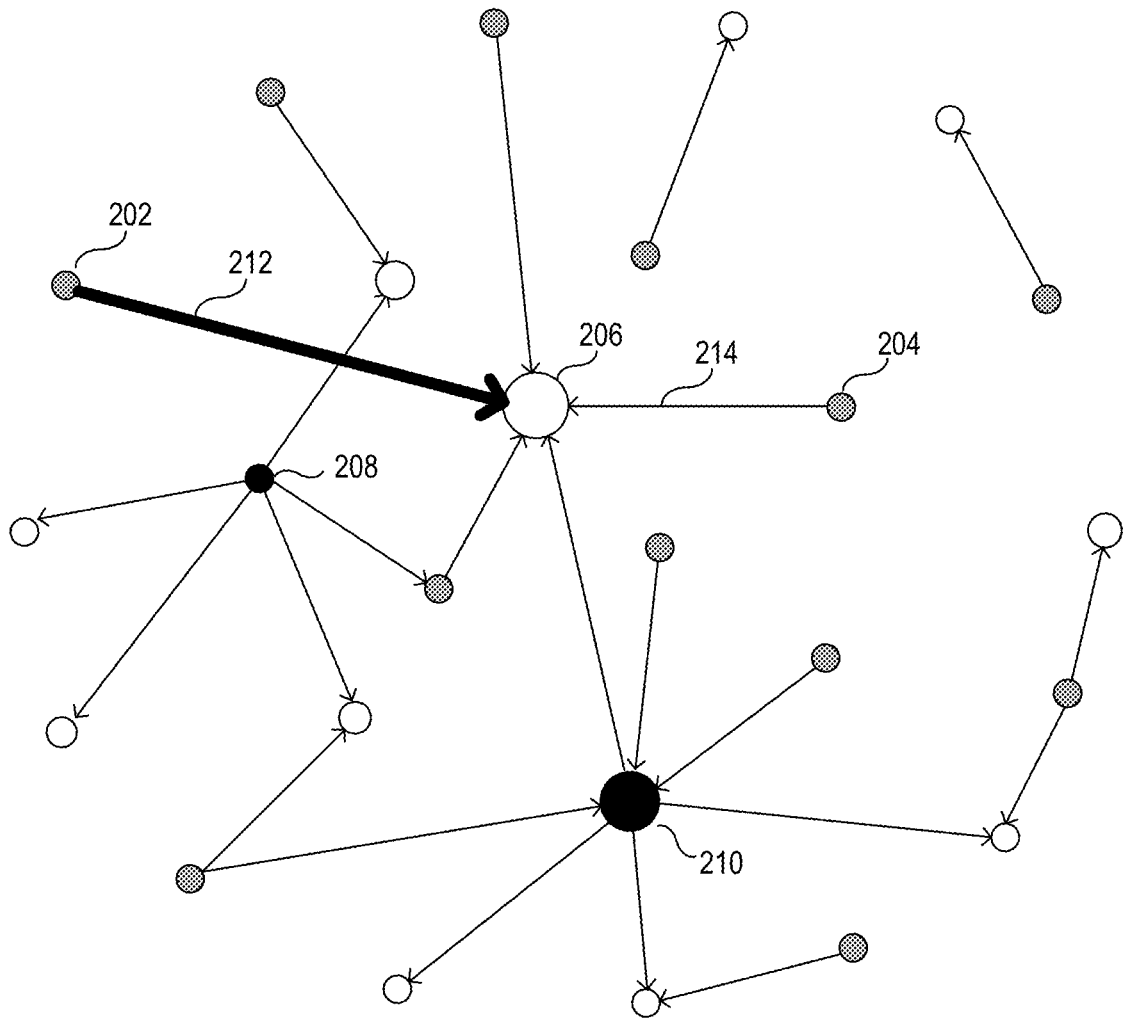
FIG. 2 illustrates an example of a dependency graph, in accordance with various embodiments.

FIG. 2 illustrates an example of a dependency graph, in accordance with various embodiments. The example of FIG. 2 is a visual representation of a data structure containing nodes representing processes and links representing blocking relationships between the nodes. As illustrated in the example of FIG. 2, nodes can be represented by circles on the graph, such as nodes 202, 204, 206, 208, and 210. Blocking relationships, or links, between the nodes (e.g., nodes 202, 204, 206, 208, and 210) can be represented by arrows connecting the nodes, such as arrows 212 and 214. For example, the arrow 212 pointing from node 202 to node 206 can represent node 206 blocking node 202. All blocking relationships can be visualized in this manner to demonstrate the nodes and the blocking relationships between the nodes. Further, thickness or weight of an arrow can represent certain metrics regarding the blocking relationship, such as the frequency of blocking, or the blocking time between nodes. For example, heavier weight arrows, such as arrow 212, can indicate relatively longer blocking time or relatively higher blocking frequency of the corresponding blocking relationship compared to the blocking relationship represented by lower weight arrows, such as arrow 214.

In various embodiments, nodes can represent different granularity objects to produce different granularity dependency graphs. For example, nodes can be operation types, code lines, etc. If nodes represent operation types, the graph can show different operation types' blocking relationships. If nodes represent code lines, the graph can show different code lines' blocking relationships.

Further, a node's color and size can be associated with metrics to convey additional visualized information. In various embodiments, a node's size can be based on the nodes blocked by the node. Likewise, a node's size can be based on the number of arrows pointing to the node. For example, a node's larger size can indicate that the node has a stronger tendency to block other nodes than smaller nodes, or that the node blocks a larger number of nodes than smaller nodes. In various embodiments, a node's color can be based on the nodes that block the node, or the color of the node can be based on the number of arrows pointing away from the node. For example, a node's darker color can indicate that the node has a stronger tendency to be blocked by other nodes than lighter color nodes, or that the node is blocked by a larger number of nodes than lighter color nodes.

Hence, a node that is large and light in color (e.g., node 206) has a strong tendency to block other nodes (indicated by the large size) but does not have a strong tendency to be blocked by other nodes (indicated by the light color). A node that is small and dark (e.g., node 208) has a strong tendency to be blocked by other nodes (indicated by the dark color) but does not have a strong tendency to block other nodes (indicated by the small size). Accordingly, a node that is large and dark (e.g., node 210) would have a strong tendency to block other nodes as well as to be blocked by other nodes.

As illustrated in the example of FIG. 2, a dependency graph can visualize a large number of blocking relationships in ways that allows a viewer to analyze and understand blocking patterns and evaluate lock contention issues in the system. Accordingly, the system indicates which processes introduce the most issues due to lock contention. In various embodiments, additional algorithms can be used to perform deeper analysis of a node's influence on lock contention issues in the system. Such algorithms can be used in conjunction with data structures and graphs, such as the graph illustrated in the example of FIG. 2.

In various embodiments, a node's role or influence in lock contention can be analyzed and quantified based on the Hyperlink-Induced Topic Search ("HITS") algorithm, which is generally used for web page link analysis. In the webpage context, the HITS algorithm calculates a hub score and an authority score for each node based on a webpage's mutual links. In various embodiments, the HITS algorithm can be applied in the lock contention analysis setting. For example, by plugging the HITS algorithm into a dependency graph, two scores calculated by the algorithm can be used to recognize and quantify a node's role in lock contention. In various embodiments, the authority score used in the HITS algorithm can be substituted with a node's blocking score (also referred to herein as the "criminal score"), and the hub score used in the HITS algorithm can be substituted with a node's blocked score (also referred to herein as the "victim score").

More specifically, in various embodiments based on the HITS algorithm, each node can be assigned a criminal score and a victim score. Each node's criminal score is based on the victim scores of the nodes that are blocked by the node, and the node's victim score is based on the criminal scores of the nodes that block the node. For example, each node's criminal score can be equal to the sum of the victim scores of the nodes that the node blocks, divided by a normalization factor; and the node's victim score can be equal to the sum of the criminal scores of the nodes that block the node, divided by a normalization factor. The algorithm performs several iterations, each iteration containing two steps. In the first step, the algorithm updates the victim score of all the nodes, in the second step, the algorithm updates the criminal score of all the nodes. The iterations can continue until the algorithm converges, until a predetermined number of iterations has been performed, or until a predetermined amount of time has passed. For example, the algorithm may be determined to converge once the change between iterations in the criminal score and/or the victim score of each node is lower than a predetermined threshold. Thus, a node will have a high criminal score if it blocks nodes that have high victim scores, and a node will have a high victim score if it is blocked by nodes that have high criminal scores.

In another embodiment, the criminal score and/or the victim score of a node can be calculated as a weighted average based on weights of the blocking relationships between the node and other nodes with which the node interacts, wherein the weights correspond to the severity of blocking relationships between the nodes. The weight can depend on factors such as the blocking time of lock contention or the frequency of lock contention, or other characteristics related to lock contention between the nodes. For example, a weight can be assigned to each blocking relationship between two nodes, where the weight is related to the severity of the blocking relationship. The weight can be based on the frequency of lock contention or the blocking time of lock contention, or other characteristics related to lock contention between nodes. Accordingly, the criminal score of each node can be calculated by summing the products of the victim score of each node blocked by the node and the weight of the blocking relationship, and dividing by a normalization factor. Similarly, each node's victim score can be calculated by summing the products of the criminal score of each node blocking the node and the weight of the blocking relationship, and dividing by a normalization factor.

Figure 3:
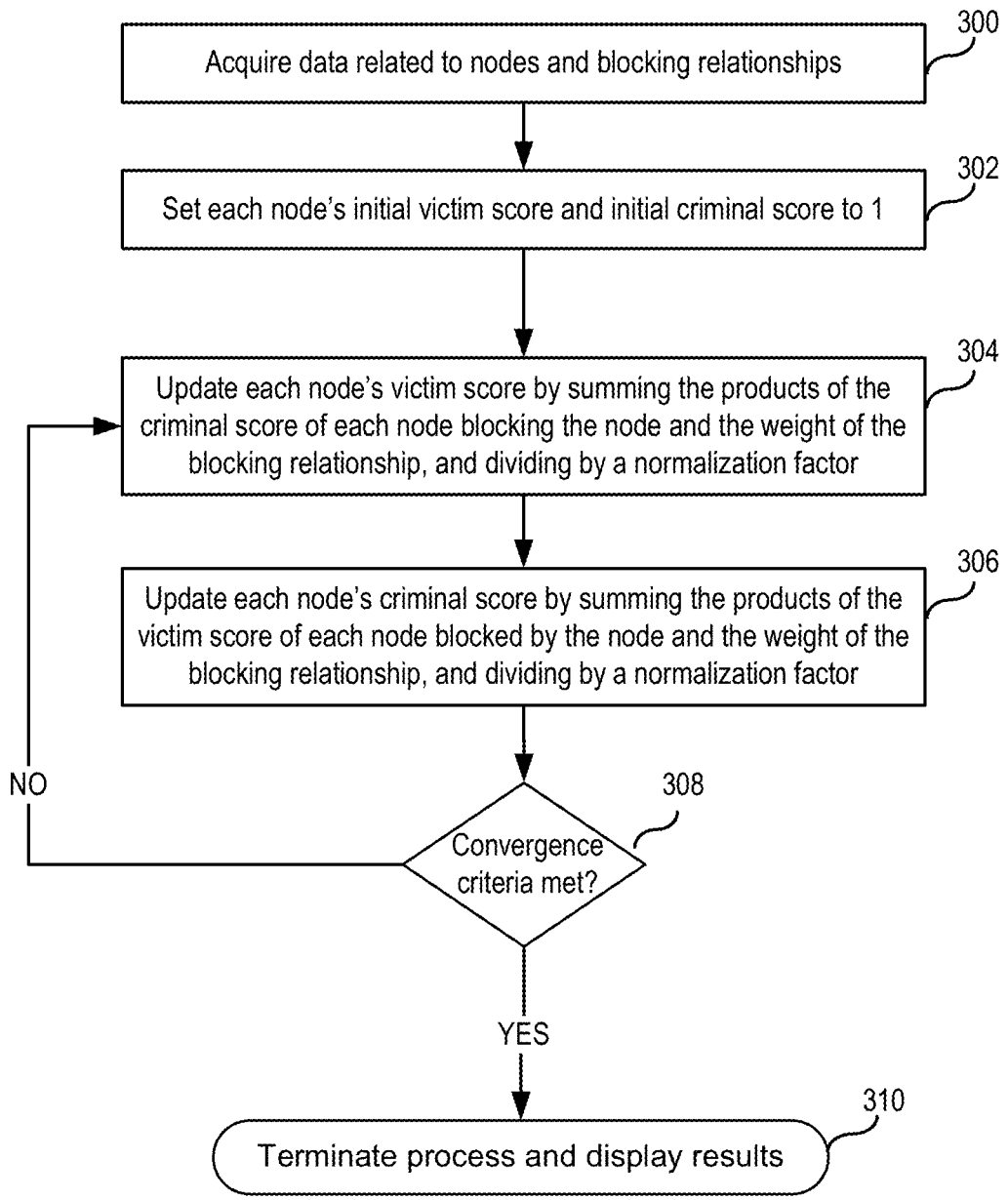
FIG. 3 illustrates an example process flow of a HITS-based algorithm for evaluating lock contention issues, in accordance with various embodiments.

FIG. 3 illustrates an example process flow of a HITS-based algorithm for evaluating lock contention issues, in accordance with various embodiments. As illustrated in the example, the process starts by acquiring data related to nodes and blocking relationships between the nodes 300 during execution of a computing device. As described above, such data can be obtained by recording log messages and parsing and analyzing the logs. Each node's initial victim score and initial criminal score is set to the value of 1 302. In various embodiments, the initial victim score and/or the initial criminal score can be set to other predetermined initial values, such as a different fixed number or a number that is calculated based on certain predetermined factors. Subsequently, the algorithm updates each node's victim score by summing the products of the criminal score of each node blocking the node and the weight of the blocking relationship, and dividing by a normalization factor 304. As described above, the weight of the blocking relationship can be calculated based on various factors related to the severity of the blocking relationship between two nodes. Similarly, each node's criminal score is updated by summing the products of the victim score of each node blocked by the node and the weight of the blocking relationship, and dividing by a normalization factor 306. The algorithm then checks whether convergence criteria has been met 308, as described above. If convergence criteria has been met, then the process terminates and the results are displayed 310. For example, the results can be displayed as a dependency graph providing a visual representation of the data structure. If the convergence criteria has not been met, then the process performs another iteration of updating the victim score 304 and updating the criminal score 306. The iterations continue until convergence criteria is met.

Figure 4:
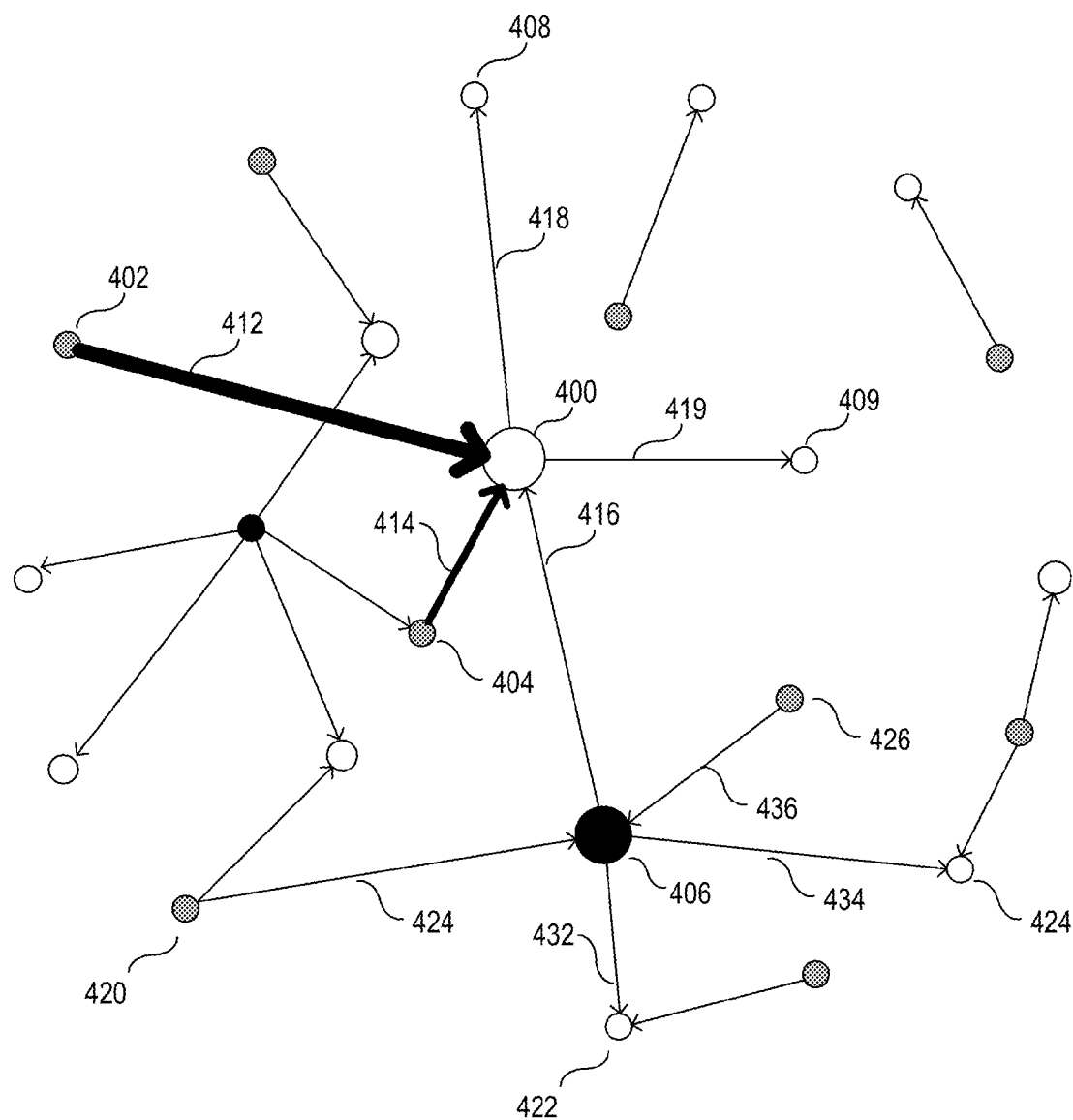
FIG. 4 illustrates an example dependency graph based on the HITS algorithm.

FIG. 4 illustrates an example dependency graph based on the HITS algorithm, in accordance with various embodiments. The example of FIG. 4 is a visual representation of a data structure containing nodes representing processes and links representing blocking relationships between the nodes. In the example of FIG. 4, each node has a criminal score and a victim score. The darker a node is, the higher is its victim score. The larger a node is, the larger is its criminal score. Blocking relationships between the nodes are represented by arrows between the nodes. An arrow points from a node that is being blocked to the node blocking it. The weight of the arrow corresponds to the weight of the blocking relationship, with heavier weight indicating a more severe blocking relationship. Accordingly, the criminal score of each node is calculated by summing the products of the victim score of each node blocked by the node and the weight of the blocking relationship, and dividing by a normalization factor. The victim score of each node is calculated by summing the products of the criminal score of each node blocking the node and the weight of the blocking relationship, and dividing by a normalization factor.

For example, the criminal and victim score of node 400 is calculated as follows:

Criminal score of node 400=((victim score of node 402)×(weight of arrow 412)+(victim score of node 404)×(weight of arrow 414)+(victim score of node 406)×(weight of arrow 416))/criminal normalization factor;

where the criminal normalization factor is equal to the square root of the sum of the squares of all criminal scores in the graph.

Victim score of node 400=((criminal score of node 408)×(weight of arrow 418)+(criminal score of node 409)×(weight of arrow 419))/victim normalization factor;

where the victim normalization factor is equal to the square root of the sum of the squares of all victim scores in the graph.

Similarly, the criminal and victim score of node 406 is calculated as follows:

Criminal score of node 406=(victim score of node 420)×(weight of arrow 424)+(victim score of node 426)×(weight of arrow 436)/criminal normalization factor;

where the criminal normalization factor is equal to the square root of the sum of the squares of all criminal scores in the graph.

Victim score of node 406=(criminal score of node 400)×(weight of arrow 416)+(criminal score of node 424)×(weight of arrow 434)+(criminal score of node 422)×(weight of arrow 432)/victim normalization factor;

where the victim normalization factor is equal to the square root of the sum of the squares of all victim scores in the graph.

Accordingly, the criminal and victim score of each node in the graph of FIG. 4 is calculated in the same manner as node 400 and node 406.

Hence, the algorithm performs numerous iterations by updating the victim scores of all nodes, then updating the criminal scores of all nodes, then re-updating the victim scores of all nodes using updated criminal scores, then re-updating the criminal scores of all nodes using updated victim scores, and so on until the algorithm converges or the process is otherwise called to end. Initially, all score values can be set to a predetermined initial value, such as 1. In various embodiments, initial score values can be set to other predetermined initial values, such as a different fixed number or a number that is calculated based on certain predetermined factors.

The HITS algorithm approach has various benefits. For example, the criminal and victim scores of the nodes calculated using the HITS algorithm reflect the interaction of the node with the broader system as opposed to just the nodes that block or are blocked by the node directly. Namely, the algorithm determines a node's victim and criminal scores based on the criminal and victim scores of not only the nodes that are blocking or are blocked by the node directly but also on the scores of nodes with which the node does not have direct blocking relationships. Accordingly, a node's criminal and victim scores reflect broader system effects than a simpler approached based only on the number of blocking relationships that a node has.

Accordingly, a dependency graph, such as the example of FIG. 4 can be analyzed to identify and understand lock contention issues. For example, in the graph of FIG. 4, there are two large nodes. Node 400 is light and node 406 is dark. This indicates that the large light node 400 is primarily criminal, meaning that the node 400 primarily blocks other nodes and should be optimized. The node 406 is both criminal and victim. Hence, it may be difficult to shorten this node's 406 lock holding time because it is significantly blocked by other nodes. Accordingly, the system indicates which processes introduce the most issues due to lock contention.

In various embodiments, a node's role or influence in lock contention can be analyzed and quantified based on the PageRank algorithm, which is generally used for webpage link analysis. The PageRank algorithm determines a webpage's score based on the quality of webpages that link to it. The algorithm is based on the assumption that a quality webpage will have more quality webpages link to it than a poor quality webpage. Accordingly, a website linked to by good websites should be higher quality than a website linked to by bad websites. Based on the above assumptions, the algorithm performs several iterations. In each iteration, the algorithm updates each node's score based on the scores of the nodes linking to the node, until the algorithm converges.

The PageRank algorithm can be applied in the context of lock contention analysis and for calculating nodes' optimization priority. In other words, the PageRank algorithm can be used to determine which nodes cause significant lock contention issues and thus are the most important to optimize. In this context, the algorithm is based on the assumption that a node that blocks a criminal node should have higher optimization priority than a node that blocks a non-criminal node.

Accordingly, in various embodiments, each node is assigned an optimization priority score. Each node's priority score is based on the priority scores of the nodes that are blocked by the node. For example, each node's priority score can be equal to the weighted sum of the priority scores of the nodes that the node blocks. Thus, a node will have a high priority score if it blocks nodes that have high priority scores. In another embodiment, each node's priority score can be calculated as a weighted average based on nodes and link weights, analogous to the weighted average calculation described above for the HITS algorithm. Further, the link weights can be normalized.

For example, the priority score can be equal to the sum of the products of the priority score of each node that the node blocks and the normalized weight of the blocking relationship. The algorithm performs several iterations. In each iteration, the algorithm updates the priority score of all the nodes. The iterations can continue until the algorithm converges, until a predetermined number of iterations has been performed, or until a predetermined amount of time has passed. For example, the algorithm may be determined to converge once the change in the priority score of each node between consecutive iterations is lower than a predetermined threshold.

In various embodiments, the priority score of a node can be calculated as a weighted average based on weights of the blocking relationships between the node and the nodes which it blocks, wherein the weights correspond to the severity of blocking relationships between the nodes. The weight can depend on factors such as the blocking time of lock contention, the frequency of lock contention, or other characteristics related to lock contention between the nodes. For example, a weight can be assigned to each blocking relationship between two nodes, where the weight is related to the severity of the blocking relationship. The weight can be based on the frequency of lock contention, the blocking time of lock contention, or other characteristics related to lock contention between nodes. Accordingly, the priority score of each node can be calculated by summing the products of the priority score of each node blocked by the node and the normalized weight of the blocking relationship.

Figure 5:
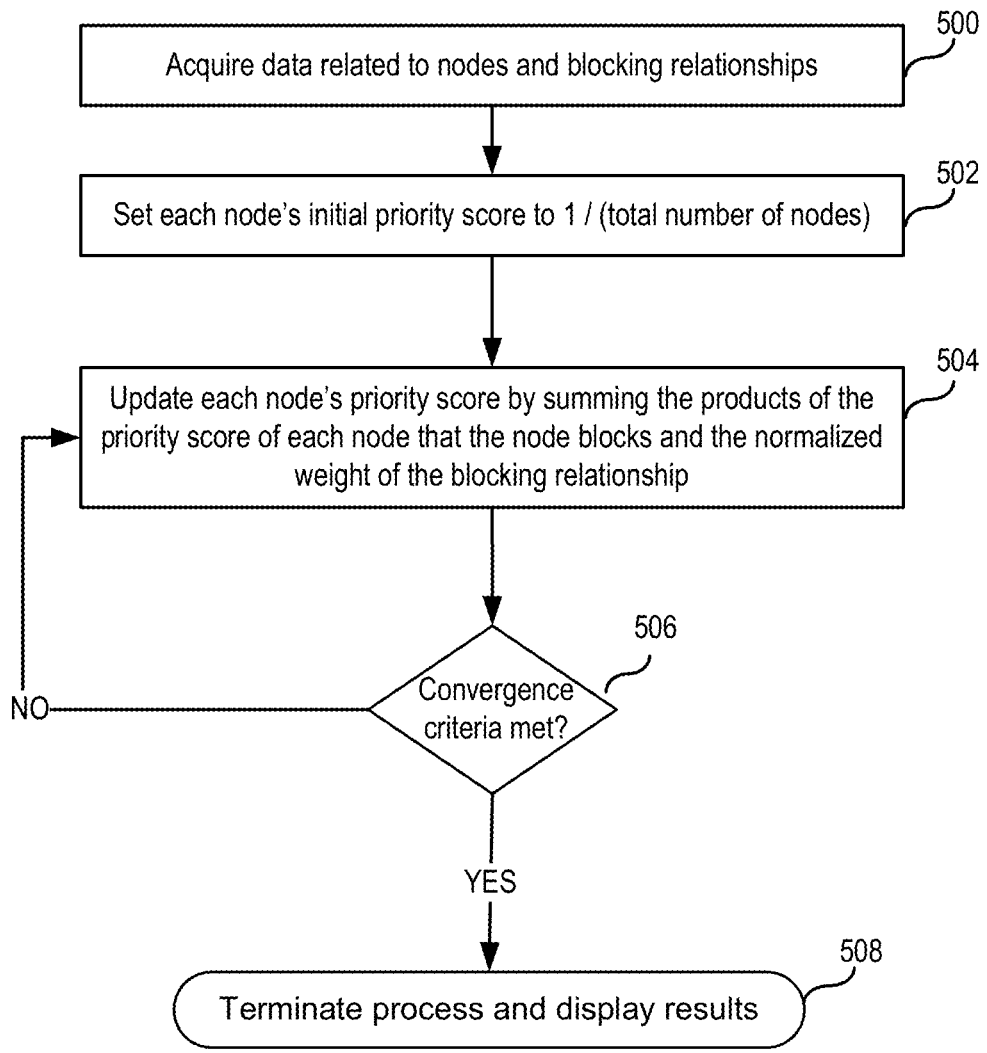
FIG. 5 illustrates an example process flow of a PageRank-based algorithm for evaluating lock contention issues, in accordance with various embodiments.

FIG. 5 illustrates an example process flow of a PageRank-based algorithm for evaluating lock contention issues, in accordance with various embodiments. As illustrated in the example process flow, the process starts by acquiring data related to nodes and blocking relationships between the nodes 500 during operation of a computing device. As described above, such data can be obtained by recording log messages and parsing and analyzing the logs. Each node's initial priority score is set to the value of 1/(total number of nodes) 502. Subsequently, the algorithm updates each node's priority score by summing the products of the priority score of each node that the node blocks and the normalized weight of the blocking relationship 504. As described above, the weight of the blocking relationship can be calculated based on various factors related to the severity of the blocking relationship between two nodes. In various embodiments, the normalized weight of the blocking relationship between a first node that blocks a second node can be calculated by dividing the weight of the blocking relationship between the first node and the second node by the sum of the weights of all blocking relationships between the second node and all nodes blocking the second node.

The algorithm then checks whether convergence criteria has been met 506, as described above. If convergence criteria has been met, then the process terminates and the results are displayed 508. For example, the results can be displayed as a dependency graph providing a visual representation of the data structure. If the convergence criteria has not been met, then the process performs another iteration of updating the priority score 504. The iterations continue until convergence criteria is met.

Figure 6:
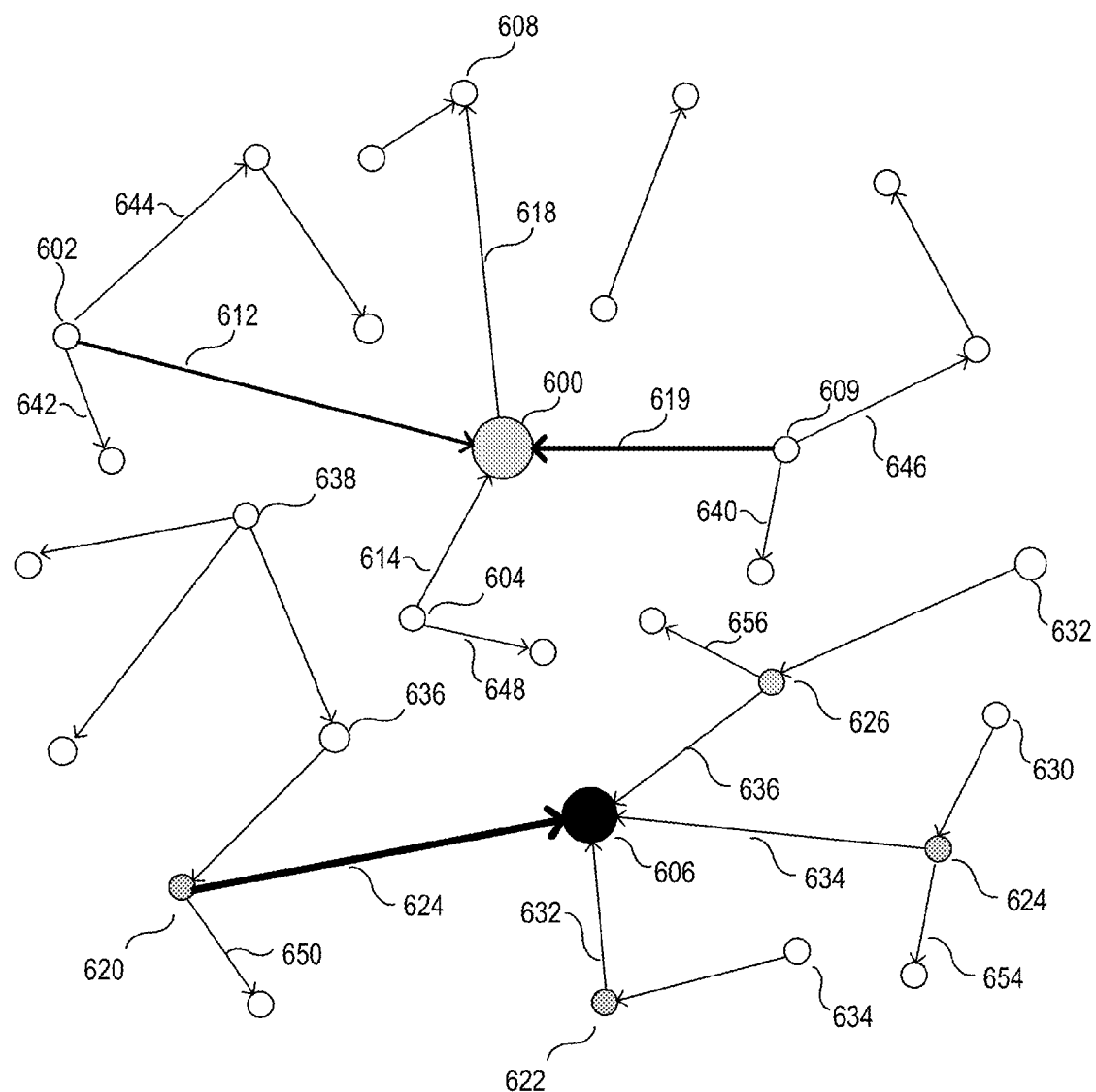
FIG. 6 illustrates an example dependency graph based on the PageRank algorithm, in accordance with various embodiments.

FIG. 6 illustrates an example dependency graph based on the PageRank algorithm, in accordance with various embodiments. The example of FIG. 6 is a visual representation of a data structure containing nodes representing processes and links representing blocking relationships between the nodes. In the example of FIG. 6, each node has an optimization priority score. The darker a node is, the higher is its priority score. The size of the node represents its weighted-in-degree, in other words, the size of the node represents the node's tendency to block nodes that are directly linked. For example, the weighted in degree can be calculated by adding the weights of all the arrows pointing towards the node. Hence, the larger a node is, the more severe is its blocking tendency towards directly linked nodes.

Blocking relationships between the nodes are represented by arrows between the nodes. An arrow points from a node that is being blocked to the node blocking it. The weight of the arrow corresponds to the weight of the blocking relationship with heavier weight indicating a more severe blocking relationship. Accordingly, the priority score of each node can be calculated by summing the products of the priority score of each node blocked by the node and the normalized weight of the blocking relationship. In various embodiments, the normalized weight of the blocking relationship between a first node that blocks a second node can be calculated by dividing the weight of the blocking relationship between the first node and the second node by the sum of the weights of all blocking relationships between the second node and all nodes blocking the second node.

For example, the priority score of node 600 is calculated as:

Priority score of node 600=(priority score of node 602)×(weight of arrow 612)/(weight of arrow 612+weight of arrow 642+weight of arrow 644)+(priority score of node 609)×(weight of arrow 619)/(weight of arrow 619+weight of arrow 640+weight of arrow 646)+(priority score of node 604)×(weight of arrow 614)/(weight of arrow 614+weight of arrow 648)

Similarly, the priority score of node 606 is calculated as:

Priority score of node 606=(priority score of node 620)×(weight of arrow 624)/(weight of arrow 624+weight of arrow 650)+(priority score of node 626)×(weight of arrow 636)/(weight of arrow 636+weight of arrow 656)+(priority score of node 624)×(weight of arrow 634)/(weight of arrow 634+weight of arrow 654)+(priority score of node 622)×(weight of arrow 632)/(weight of arrow 632)

Accordingly, the priority score of each node in the graph of FIG. 6 is calculated in the same manner as node 600 and node 606.

Hence, the algorithm performs numerous iterations by updating the priority scores of all nodes, then re-updating the priority scores of all nodes using updated priority scores, and so on until the algorithm converges. Initially, the priority score value of each node can be set to a predetermined initial value, such as 1/(total number of nodes). In various embodiments, the initial victim score and/or the initial criminal score can be set to other predetermined initial values, such as a different fixed number or a number that is calculated based on certain predetermined factors.

This approach can reveal useful information for assessing locking relationship issues. For example, FIG. 6 illustrates two large nodes. Node 606 is dark and node 600 is light. The dark node 606 has the highest priority score. Accordingly, optimizing the dark node 606 will make the largest impact on optimizing the system. This can be illustrated by observing this graph's structure. The dark node 606, either directly or indirectly, blocks nodes 620, 622, 624, 626, 630, 632, 634, 636, and 638. Hence, shortening this node's 606 lock holding time may benefit all these nodes 620, 622, 624, 626, 630, 632, 634, 636, and 638. The large light node 600 only blocks nodes 602, 604, and 609. Further, some of the node's 600 neighbor nodes 602, 609 are not only blocked by this node 600, but also by other nodes. Therefore, minimizing this node's 600 influence is not as important as optimizing node 606. Hence, the priority score can be used to determine optimization priority from the point of view of global optimization of the system.

Thus, the PageRank algorithm approach has certain benefits. Namely, the priority score of a node calculated using the PageRank algorithm reflects the interaction of the node with the broader system as opposed to just the nodes that have direct blocking relationships with the node. For example, the algorithm determines a node's priority score based on the priority scores of not only the nodes that are blocked by the node but also on the scores of nodes with which the node does not have direct blocking relationships. Accordingly, a node's priority scores reflect broader system effects than a simpler approached based only on direct blocking relationships. Thus, the system indicates which processes introduce the most issues due to lock contention.

Figure 7:
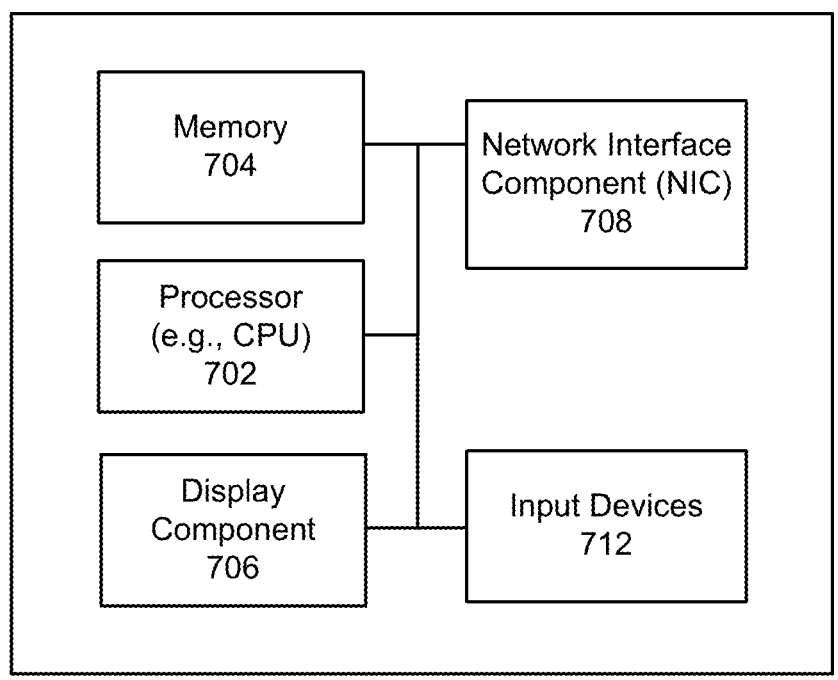
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702) for executing instructions that can be stored in physical memory component 704. The memory component 704 can include many types of memory, data storage, or non-transitory computer-readable storage media, such as random access memory (RAM) storing program instructions for execution by the processor 702, a separate form of storage for images or data, a removable memory for sharing information with other devices and the like. The computing device typically can further comprise a display component 706, such as a monitor, a touch screen, liquid crystal display (LCD), or the like. In various embodiments, the computing device will include at least one input device 712 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 708 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. Computing devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
    executing a computing device for a predetermined time interval and recording data related to the execution of the computing device into a log;
    analyzing the data recorded into the log to identify blocking relationships between processes executing on the computing device, wherein blocking relationships comprise lock contention information related to a first process being blocked by a second process due to the first process being unable to acquire a lock on an object because the second process is holding the lock on the object; and
    plotting the data into a graph data structure comprising:
        a plurality of nodes, each node representing one of the processes executing on the computing device; and
        links between the nodes, wherein a link between two nodes describes a blocking relationship between the two nodes, including indication of which of the two nodes blocks the other;
    setting a predetermined initial optimization priority score for each node;
    performing a first update of the optimization priority score of each node by calculating, for the each node, a first updated optimization score based on links between the each node and nodes blocked by the each node and on the initial optimization priority scores of the nodes blocked by the each node;
    performing a second update of the optimization priority score of each node by calculating, for each node, a second updated optimization score based on links between the each node and nodes blocked by the each node and on the first optimization priority scores of the nodes blocked by the each node;
    performing subsequent updates of the optimization priority score of each node until predetermined criteria for terminating the process are met;
    wherein the optimization priority score of a given node is a value that is deemed to correspond to an extent of impact of the given node on efficiency of operation of the computing device; and
    indicating one or more nodes on a visual display, wherein the indicating the one or more nodes further relates to how the indicated one or more nodes is deemed to impact efficiency of operation of the computing device based on a most recently updated optimization priority score of the indicated one or more nodes.

2. The method of claim 1, wherein the predetermined criteria for terminating the process comprises at least one of:
    a predetermined number of updates occurring;
    a predetermined period of time passing; or
    convergence.

3. The method of claim 2, wherein convergence occurs when the change in the optimization priority score of each node as a result of an update is less than a predetermined threshold.

4. The method of claim 1, wherein:
    the updating the optimization priority score of the each node further comprises summing the optimization priority scores of the nodes blocked by the each node.

5. The method of claim 1, wherein:
    the updating the optimization priority score of the each node further comprises summing the products of the optimization priority score of each node blocked by the each node and the normalized weight of the blocking relationship;
    wherein the weight of the blocking relationship between two nodes is based on at least one of the frequency of blocking between the two nodes or the blocking time between the two nodes.

6. The method of claim 5, wherein:
    the normalized weight of the blocking relationship between a first node that blocks a second node is calculated by dividing the weight of the blocking relationship between the first node and the second node by the sum of the weights of all blocking relationships between the second node and nodes blocking the second node.

7. The method of claim 1, wherein the indicating the one or more nodes on the visual display further comprises:
    producing a graph comprising an illustration representing each node, the optimization priority score of each node, and blocking relationships between the nodes.

8. A computing device, comprising:
    at least one processor; and
    memory including instructions that, when executed by the at least one processor, cause the computing device to:
        execute a computing device for a predetermined time interval and record data related to the execution of the computing device into a log;
        analyze the data recorded into the log to identify blocking relationships between processes executing on the computing device, wherein blocking relationships comprise lock contention information related to a first process being blocked by a second process due to the first process being unable to acquire a lock on an object because the second process is holding the lock on the object; and
        plot the data into a graph data structure comprising:
            a plurality of nodes, each node representing one of the processes executing on the computing device; and
            links between the nodes, wherein a link between two nodes describes a blocking relationship between the two nodes, including indication of which of the two nodes blocks the other;
        set a predetermined initial optimization priority score for each node;
        perform a first update of the optimization priority score of each node by calculating, for the each node, a first updated optimization score based on links between the each node and nodes blocked by the each node and on the initial optimization priority scores of the nodes blocked by the each node;

perform a second update of the optimization priority score of each node by calculating, for each node, a second updated optimization score based on links between the each node and nodes blocked by the each node and on the first optimization priority scores of the nodes blocked by the each node;

perform subsequent updates of the optimization priority score of each node until predetermined criteria for terminating the process are met;

wherein the optimization priority score of a given node is a value that is deemed to correspond to an extent of impact of the given node on efficiency of operation of the computing device; and indicate one or more nodes on a visual display, wherein the indicating the one or more nodes further relates to how the indicated one or more nodes is deemed to impact efficiency of operation of the computing device based on a most recently updated optimization priority score of the indicated one or more nodes.

9. The computing device of claim 8, wherein the predetermined criteria for terminating the process comprises at least one of:
a predetermined number of updates occurring;
a predetermined period of time passing; or
convergence.

10. The computing device of claim 9, wherein convergence occurs when the change in the optimization priority score of each node as a result of an update is less than a predetermined threshold.

11. The computing device of claim 8, wherein:
the updating the optimization priority score of the each node further comprises summing the optimization priority scores of the nodes blocked by the each node.

12. The computing device of claim 8, wherein:
the updating the optimization priority score of the each node further comprises summing the products of the optimization priority score of each node blocked by the each node and the normalized weight of the blocking relationship;
wherein the weight of the blocking relationship between two nodes is based on at least one of the frequency of blocking between the two nodes or the blocking time between the two nodes.

13. The computing device of claim 12, wherein:
the normalized weight of the blocking relationship between a first node that blocks a second node is calculated by dividing the weight of the blocking relationship between the first node and the second node by the sum of the weights of all blocking relationships between the second node and nodes blocking the second node.

14. The computing device of claim 8, wherein the indicating the one or more nodes on the visual display further comprises:
producing a graph comprising an illustration representing each node, the optimization priority score of each node, and blocking relationships between the nodes.

15. A non-transitory computer readable storage medium comprising one or more sequences of instructions, the instructions when executed by one or more processors causing the one or more processors to execute the operations of:

executing a computing device for a predetermined time interval and recording data related to the execution of the computing device into a log;

analyzing the data recorded into the log to identify blocking relationships between processes executing on the computing device, wherein blocking relationships comprise lock contention information related to a first process being blocked by a second process due to the first process being unable to acquire a lock on an object because the second process is holding the lock on the object; and plotting the data into a graph data structure comprising:
a plurality of nodes, each node representing one of the processes executing on the computing device; and
links between the nodes, wherein a link between two nodes describes a blocking relationship between the two nodes, including indication of which of the two nodes blocks the other;

setting a predetermined initial optimization priority score for each node;

performing a first update of the optimization priority score of each node by calculating, for the each node, a first updated optimization score based on links between the each node and nodes blocked by the each node and on the initial optimization priority scores of the nodes blocked by the each node;

performing a second update of the optimization priority score of each node by calculating, for each node, a second updated optimization score based on links between the each node and nodes blocked by the each node and on the first optimization priority scores of the nodes blocked by the each node;

performing subsequent updates of the optimization priority score of each node until predetermined criteria for terminating the process are met wherein the optimization priority score of a given node is a value that is deemed to correspond to an extent of impact of the given node on efficiency of operation of the computing device; and indicating one or more nodes on a visual display, wherein the indicating the one or more nodes further relates to how the indicated one or more nodes is deemed to impact efficiency of operation of the computing device based on a most recently updated optimization priority score of the indicated one or more nodes.

16. The non-transitory computer readable storage medium of claim 15, wherein the predetermined the criteria for terminating the process comprises at least one of:
a predetermined number of updates occurring;
a predetermined period of time passing; or
convergence.

17. The non-transitory computer readable storage medium of claim 16, wherein convergence occurs when the change in the optimization priority score of each node as a result of an update is less than a predetermined threshold.

18. The non-transitory computer readable storage medium of claim 15, wherein:
the updating the optimization priority score of the each node further comprises summing the products of the optimization priority score of each node blocked by the each node and the normalized weight of the blocking relationship;
wherein the weight of the blocking relationship between two nodes is based on at least one of the frequency of blocking between the two nodes or the blocking time between the two nodes.

19. The non-transitory computer readable storage medium of claim 18, wherein:
   the normalized weight of the blocking relationship between a first node that blocks a second node is calculated by dividing the weight of the blocking relationship between the first node and the second node by the sum of the weights of all blocking relationships between the second node and nodes blocking the second node.

20. The non-transitory computer readable storage medium of claim 15, wherein the indicating the one or more nodes on the visual display further comprises:
   producing a graph comprising an illustration representing each node, the optimization priority score of each node, and blocking relationships between the nodes.

* * * * *